United States Patent

Joyce et al.

[11] Patent Number: 5,947,089
[45] Date of Patent: Sep. 7, 1999

[54] METHOD OF COMPENSATING FOR A FAILED SENSOR IN A FLEXIBLE FUELED VEHICLE

[75] Inventors: Mary Joyce, Farmington Hills; Mark E. Hope; Shean Huff, both of Ann Arbor; Howard W. Krausman, Dexter; Richard K. Moote, Ann Arbor; William D. Rotramel, Plymouth; Gary L. Seitz, Chelsea, all of Mich.

[73] Assignee: Chrysler Corporation, Auburn Hills, Mich.

[21] Appl. No.: 08/959,695

[22] Filed: Oct. 29, 1997

[51] Int. Cl.⁶ .................................................. F02M 51/00
[52] U.S. Cl. ........................... 123/479; 123/689; 123/690
[58] Field of Search .................................. 123/479, 689, 123/690, 494

[56] References Cited

U.S. PATENT DOCUMENTS

| | | |
|---|---|---|
| 5,007,398 | 4/1991 | Kashiwabara ............................ 123/690 |
| 5,181,499 | 1/1993 | Kayanuma ............................... 123/690 |
| 5,255,661 | 10/1993 | Nankee, II et al. . |
| 5,335,637 | 8/1994 | Davis et al. . |
| 5,365,917 | 11/1994 | Adams et al. . |
| 5,400,762 | 3/1995 | Fodale et al. . |
| 5,415,145 | 5/1995 | Letcher et al. . |
| 5,435,285 | 7/1995 | Adams et al. . |
| 5,467,755 | 11/1995 | Konrad et al. . |
| 5,477,842 | 12/1995 | Maruyama et al. ..................... 123/690 |
| 5,497,753 | 3/1996 | Kopera . |
| 5,520,162 | 5/1996 | Rotramel et al. . |
| 5,526,267 | 6/1996 | Sogawa ................................... 123/690 |
| 5,559,706 | 9/1996 | Fujita ...................................... 123/690 |
| 5,579,747 | 12/1996 | Sato et al. .............................. 123/690 |
| 5,617,337 | 4/1997 | Eidler ...................................... 123/479 |
| 5,687,694 | 11/1997 | Kanno ..................................... 123/479 |

*Primary Examiner*—John Kwon
*Attorney, Agent, or Firm*—Mark P. Calcaterra

[57] ABSTRACT

The present invention provides a method of compensating for an erroring sensor in a flexible fuel compensation control system for a flexible fueled vehicle. The methodology provides a method for identifying preselected operating conditions without the output of the erroring sensor. As such, the flexible fuel compensation control system may still be employed to ensure vehicle drivability even in the absence of input from an erroring sensor.

12 Claims, 2 Drawing Sheets

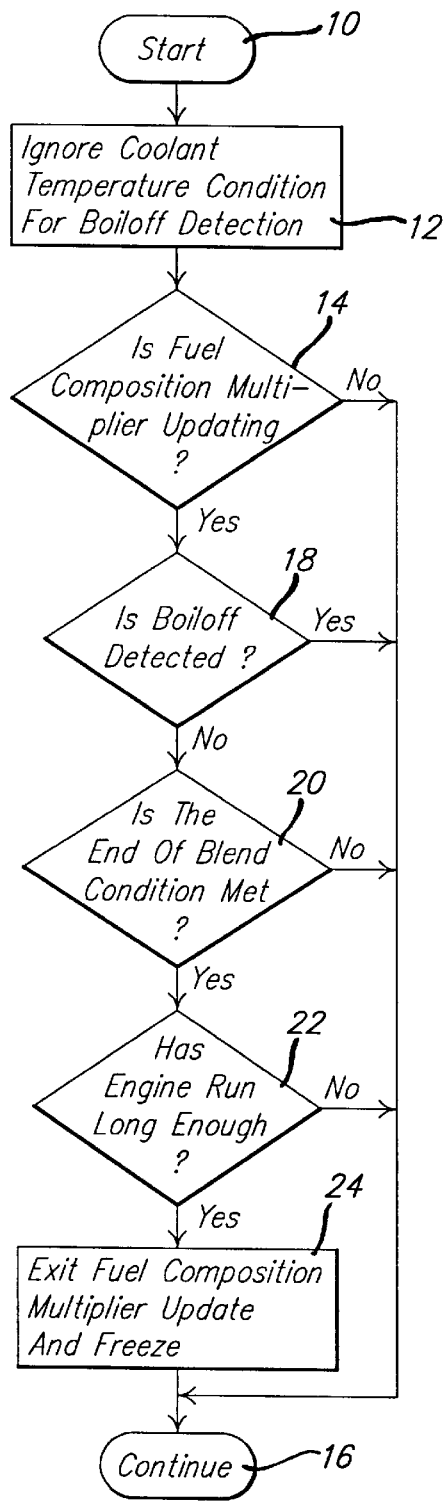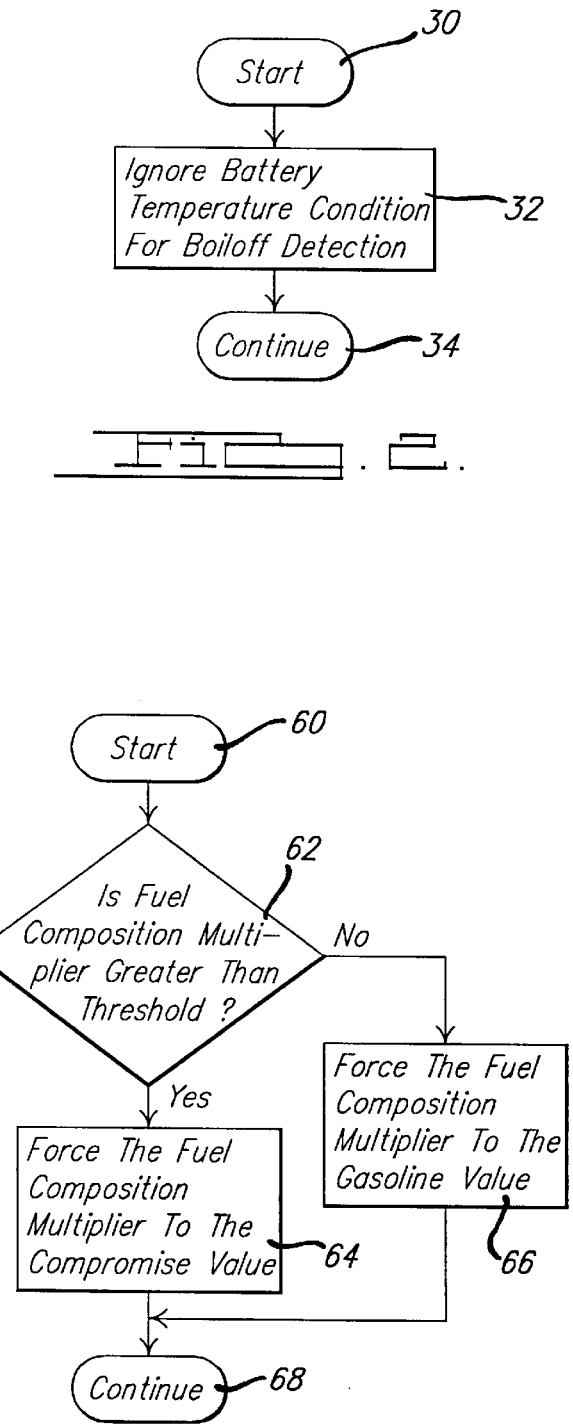

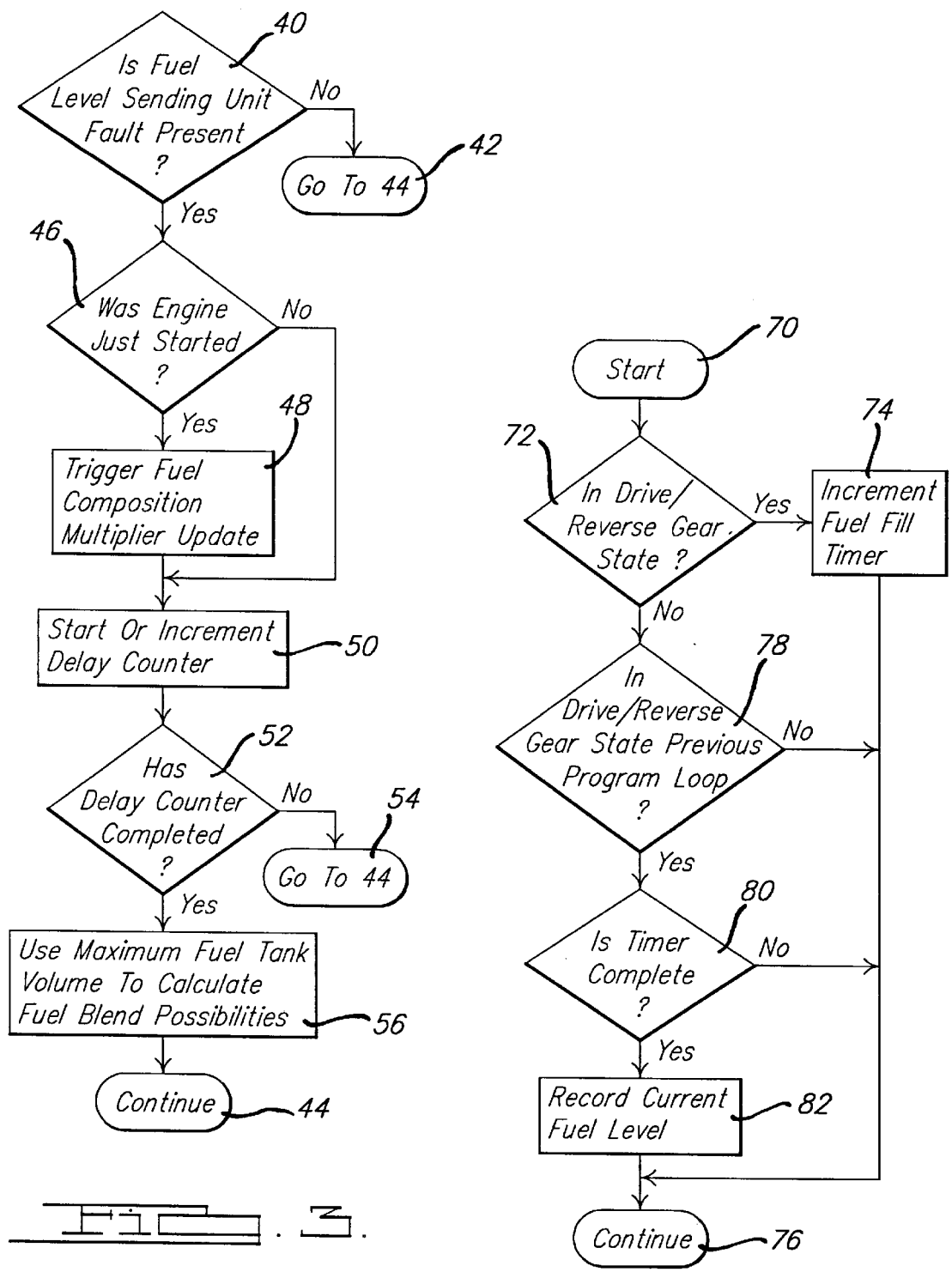

METHOD OF COMPENSATING FOR A FAILED SENSOR IN A FLEXIBLE FUELED VEHICLE

BACKGROUND OF THE INVENTION

1. Technical Field

The present invention relates generally to fuel control systems and, more particularly, to a method of controlling the combustion parameters of an internal combustion engine in a flexible fueled vehicle.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

There are several sensors that are not necessarily flexible fuel operation specific but which are used as inputs for flexible fuel compensation control systems. These include, but are not limited to, a coolant temperature sensor, battery temperature sensor, upstream exhaust oxygen sensor, vehicle speed sensor, and fuel level sensor.

When any one of these sensors is in error, its output cannot be used as an input for the fuel compensation control system. For instance, if the coolant sensor errors, there is no way to realize the coolant temperature and no way to detect a boil-off condition or when the internal combustion engine reaches a fully warm condition. If the battery temperature sensor errors, there is no way to sense battery temperature and no way to determine if a boil-off condition is occurring. If the upstream exhaust oxygen sensor errors, there is no feedback data for basing a determination of the fuel composition multiplier for setting fueling parameters in a fuel control system. If the vehicle speed sensor errors, there is no way to determine when the vehicle has come to a stop which may correspond to a fueling event. If a fuel level sending unit errors, there is no way to measure a fuel addition.

Therefore, it would be desirable to provide a method for compensating for erroring sensors in a flexible fuel compensation control system for a flexible fueled vehicle.

SUMMARY OF THE INVENTION

It is, therefore, one object of the present invention to provide a system of flexible fuel compensation.

It is another object of the present invention to provide a flexible fuel compensation system which detects a potential boil-off condition without the use of coolant temperature.

It is yet another object of the present invention to provide a flexible fuel compensation system that estimates when the engine reaches a fully warm condition without the use of coolant temperature.

It is still another object of the present invention to provide a flexible fuel compensation system that detects a potential boil-off condition without the use of battery temperature.

It is still yet another object of the present invention to provide a flexible fuel compensation system that sets acceptable fueling parameters without the use of an upstream exhaust oxygen sensor.

It is another object of the present invention to provide a flexible fuel compensation system which determines when the vehicle has stopped without the use of a vehicle speed sensor.

It is yet another object of the present invention to provide a flexible fuel compensation system that ensures that the fuel composition multiplier is updated after a fuel addition without the use of a fuel level sending unit.

It is still another object of the present invention to provide a flexible fuel compensation system that calculates a possible alcohol concentration after a fuel addition without sensing a fuel level change.

The above and other objects are provided by a method of compensating for an erroring sensor in a flexible fuel control system for a flexible fueled vehicle. The methodology assumes that a boil-off condition exists if all other criteria are met and the coolant temperature sensor has failed. Also, the engine is assumed to have reached a fully warm state after the expiration of a timer if the coolant temperature sensor has failed. The methodology also assumes that a boil-off condition exists if all criteria are met and the battery temperature sensor has been determined to be in error. Also, the fuel composition multiplier is forced to a preselected value acceptable for the last known fuel used if an oxygen sensor error has occurred. If the vehicle speed sensor has errored, the methodology requires that the transmission be in park or neutral before a fueling event could occur. Also, when the fuel level sending unit fails, the methodology requires that the engine be turned off for a fueling event to occur. Also, the methodology assumes that the maximum fuel tank volume was added when the fuel level sending unit fails so that the worst case fueling possibilities can be accounted for.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart of a method of flexible fuel compensation control for a flexible fueled vehicle during a coolant temperature sensor failure;

FIG. 2 is a flow chart of a method of flexible fuel compensation control for a flexible fueled vehicle during a battery temperature sensor failure;

FIG. 3 is a flow chart of a method of flexible fuel compensation control for a flexible fueled vehicle during a fuel level sending unit failure;

FIG. 4 is a flow chart of a method of flexible fuel compensation control for a flexible fueled vehicle during an upstream oxygen sensor failure; and FIG. 5 is a flow chart of a method of flexible fuel compensation control for a flexible fueled vehicle during a vehicle speed sensor failure.

DETAILED DESCRIPTION OF THE PREFERRED EMBODIMENTS

The present invention is directed towards a method of compensating for an erroring sensor in a flexible fuel compensation control system for a flexible fueled vehicle. According to the present invention, crank case boil-off routines are employed in a fuel control system even when a coolant temperature sensor or battery temperature sensor error occurs. Also, a fuel composition multiplier learning subroutine of a fuel compensation control system may be completed during a coolant temperature sensor error condition. The methodology also allows the vehicle engine to operate acceptably with an exhaust oxygen sensor error and provides a means for initializing a fuel composition multiplier learning routine of a fuel control system with a vehicle speed sensor error. Furthermore, the methodology provides a means for triggering a fuel composition multiplier routine of a fuel control system and calculating possible alcohol concentrations within the fuel during a fuel level sending unit error. Although the present invention is suitable for use with any number of fuel control systems, a preferred fuel control system is disclosed on U.S. Ser. No. 08/958,411, entitled "Method of Determining a Composition of Fuel on a Flexible Fueled Vehicle" to Nankee II et al. which is incorporated by reference herein.

1. Coolant Temperature Failure

When the coolant temperature sensor is operating correctly, coolant temperature is used to determine if the engine temperature is cold enough when the engine is started to indicate a potential boil-off condition. If the coolant temperature sensor fails, there is no way to realize the coolant temperature and a potential boil-off condition could go undetected. According to the present invention, the coolant temperature condition for detecting potential boil-off is ignored if a sensor error is detected. Therefore, a coolant temperature sensor error does not prevent the detection of potential boil-off if all the other conditions are met.

The coolant temperature is also used to determine when the engine has reached a fully warm condition so that a fuel composition multiplier routine of a fuel control system can be completed if the coolant temperature sensor is operating correctly. However, if the coolant temperature sensor errors, the current coolant temperature is not known and the routine may never be exited. Now, a timer is employed after start-up to ensure that the engine has enough time to reach a fully warm state even if the sensor errors. After the timer expires, the fuel composition multiplier routine may be completed.

In general, the timer counts up to a calibratable constant based on the amount of time the engine has been running. Therefore, the fuel composition multiplier routine may be exited if all other conditions are met after the timer elapses. The remaining conditions include the fuel blending period being complete and the absence of a boil-off condition. It should be noted that upon exiting the fuel composition multiplier routine under an erroring coolant temperature sensor condition, any fine tune percent alcohol content learning routine that may exist as a part of the fuel control system is disabled. Also, the deadband voltages for determining rich or lean operating conditions for updating the fuel control system around the oxygen sensor feedback short term fuel control multiplier that are normally modified by coolant temperature are configured to use a current default coolant temperature. This forces the default to a low temperature deadband.

Referring now to FIG. 1, a flow chart for a method of flexible fuel compensation control for a flexible fueled vehicle during a coolant temperature sensor error is illustrated. The methodology starts in bubble 10 and advances to block 12. In block 12, the methodology ignores the coolant temperature condition for determining if a boil-off condition exists. From block 12 the methodology advances to decision block 14.

In decision block 14, the methodology determines if the fuel composition multiplier of a fuel control system is updating. If not, the methodology advances to bubble 16 and is returned to bubble 10. If the fuel composition multiplier is updating at decision block 14, the methodology advances to decision block 18.

In decision block 18, the methodology determines if a boil-off condition has been detected. This is accomplished by noting battery temperature, start engine revolutions, and/or ethanol content. If a boil-off condition has been detected, the methodology advances to bubble 16 and is returned to start-up bubble 10. If no boil-off condition is detected at decision block 18, the methodology advances to decision block 20.

In decision block 20, the methodology determines if an end of a fuel blending period has been reached. This is determined by monitoring the amount of fuel delivered to the engine. If the end of the fuel blending period is not yet reached, the methodology advances to bubble 16 and is returned to start-up bubble 10. However, if the end of the fuel blending period has been reached at decision block 20, the methodology advances to decision block 22.

In decision block 22, the methodology determines if the engine has been running for a preselected period of time. The period of time that the engine must run corresponds to an amount of time sufficient for indicating that the engine is fully warm. If the engine has not been running long enough, the methodology advances to bubble 16 where it is returned to start-up bubble 10. However, if the engine has been running for a sufficient period of time at decision block 22, the methodology advances to block 24. In block 24, the methodology exits the fuel composition multiplier update routine of the fuel control system and freezes the fuel composition multiplier at its current value.

2. Battery Temperature Sensor Failure

If the battery temperature sensor is operating correctly, battery temperature is used to determine if the engine temperature is cold enough when started to indicate a possible boil-off condition. If the battery temperature sensor errors, there is no way to know the battery temperature and a potential boil-off condition might go undetected. According to the present invention, the battery temperature condition is ignored for detecting potential boil-off if a sensor error is detected. Therefore, a battery temperature sensor error does not prevent the detection of potential boil-off if all other conditions are met.

Turning to FIG. 2, a flow chart for a method of flexible fuel compensation control is illustrated for a flexible fueled vehicle during a battery temperature sensor failure. The methodology starts in bubble 30 if an error in the battery temperature sensor is detected and advances to block 32. In block 32, the methodology ignores the battery temperature condition for detecting a boil-off condition. From block 32 the methodology advances to bubble 34 where it is returned to bubble 30. By ignoring the battery temperature condition during the sensor error, a boil-off condition is assumed to be occurring if all other conditions are met.

3. Fuel Level Sending Unit Failure

When the fuel level sending unit is operating correctly, the fuel composition multiplier learning routine of a fuel control system is triggered by a measured increase in the fuel level. This trigger is unavailable when the fuel level sending unit errors. Now, a further assumption is made when the error exists which is that a fueling event will only occur when the engine is off. Therefore, the fuel composition multiplier learning routine is triggered on every start-up when the sensor errors.

Also, when the fuel level sending unit is operating correctly, minimum and maximum alcohol concentrations which could be added to the vehicle fuel tank are used to calculate two possible fuel concentrations for the engine based on fuel volume before and after the fuel fill. Without the fuel level sending output there is no way to calculate the fueling possibilities. By using the maximum fuel tank volume as the amount added, the worst case possibilities can be accounted for when the sensor errors.

When a fuel level sending unit error occurs, the methodology triggers an update of the fuel composition multiplier every subsequent time the engine is started. The maximum change in volume value (i.e., the existing tank volume calibration) is used to calculate possible fueling strategies.

Referring now to FIG. 3, a flow chart for a method of flexible fuel compensation control is illustrated for a flexible fueled vehicle during a fuel level sending unit error. The methodology starts in decision block 40 and determines if the fuel level sending unit is experiencing an error. If not, the methodology advances to bubble 42 where it is forwarded to bubble 44 and returned to decision block 40. If the fuel level sending unit is experiencing an error at decision block 40, the methodology advances to decision block 46.

In decision block 46, the methodology determines if the engine was just started. If so, the methodology advances to block 48 and triggers an update of the fuel composition multiplier of a fuel control system. After triggering the fuel composition multiplier update at block 48, or if the engine was not just started at decision block 46, the methodology advances to block 50.

In block 50, the methodology starts or increments a delay counter. After starting or incrementing the delay counter at block 50, the methodology advances to decision block 52. In decision block 52, the methodology determines if the delay counter has expired. If the delay counter has not expired at decision block 52, the methodology advances to bubble 54 where it is forwarded to bubble 44 and returned to decision block 40. If the delay counter has expired at decision block 52, the methodology advances to block 56.

In block 56, the methodology uses the maximum fuel tank volume as the amount added to calculate fuel blend possibilities for the fuel control system. After calculating the fuel blend possibilities at block 56, the methodology advances to bubble 44 where it is returned to decision block 40. By using the maximum fuel tank volume as the amount added, the worst case possibilities can be accounted for and the inferred alcohol value used in the fuel control system for determining the amount of fuel to be delivered to the engine is prevented from being forced to other values during an open loop operating condition when the sensor errors.

4. Upstream O2 Sensor Failure

When the upstream exhaust oxygen sensor is operating correctly, feedback data is provided for learning the fuel composition multiplier for controlling the amount of fuel delivered to the engine. If the exhaust oxygen sensor errors, there is no guarantee that the learned fuel composition multiplier is acceptable for indicating the actual alcohol concentration in the fuel. According to the present invention, the fuel composition multiplier is forced to an acceptable value for the last known fuel used if the sensor errors. Therefore, drivability deficiencies are avoided.

Generally, if the inferred alcohol content is less than a preselected alcohol threshold, the inferred alcohol content is forced to E0 (0% alcohol and 100% gasoline). The inferred alcohol content is held at E0 as long as the error exists. If the inferred alcohol content is greater than the alcohol threshold, the inferred alcohol content is forced to a preselected compromise value such as E60. The inferred alcohol content is held at the compromise value as long as the error exists.

Referring to FIG. 4, a flow chart for a method of flexible fuel compensation control is illustrated for a flexible fueled vehicle during an upstream oxygen sensor failure. The methodology starts in bubble 60 and advances to decision block 62. In decision block 62, the methodology determines if a fuel composition multiplier in a fuel control system is greater than a preselected threshold. If so, the methodology advances to block 64 and forces the fuel composition multiplier to a compromise value such as E60.

However, if the fuel composition multiplier is less than the threshold value, the methodology advances to block 66 and forces the fuel composition multiplier to a 100% gasoline value. After forcing the fuel composition multiplier to the 100% gasoline value at block 66 or forcing the fuel composition multiplier to the compromise value at block 64, the methodology advances to bubble 68 where it is returned to start-up bubble 60.

5. Vehicle Speed Sensor Failure

When the vehicle speed sensor is operating appropriately, a sensed vehicle speed transition from non-zero to zero triggers the storing of the current fuel volume as a before fill volume (i.e., old fuel volume). This trigger is unavailable when the vehicle speed sensor errors. According to the present invention, a further assumption is made that the transmission must be in park or neutral before a fueling event can occur if the sensor errors. Therefore, the vehicle speed transition to zero can be disregarded and replaced with a change in transmission state from drive or reverse to park or neutral.

When the vehicle speed sensor errors, the methodology uses a change from drive or reverse to park or neutral instead of a vehicle speed transition to 0 mph to record a before fill fuel volume value. Also, a fuel fill timer is incremented when in drive or reverse. This timer prevents the before fill fuel volume from being overwritten before an after fill volume is recorded.

Turning now to FIG. 5, a flow chart for a method of flexible fuel compensation control is illustrated for a flexible fueled vehicle during a vehicle speed sensor error. The methodology starts at bubble 70 and advances to decision block 72. In decision block 72, the methodology determines if the vehicle is in a drive or reverse gear state. If so, the methodology advances to block 74 and increments the fuel fill timer. After incrementing the timer at block 74, the methodology advances to bubble 76 where it is returned to start-up bubble 70.

If the methodology determines that the vehicle is not in a drive or reverse gear state at block 72, the methodology advances to decision block 78. In decision block 78, the methodology determines if the vehicle was in a drive or reverse gear state during the previous program loop. If not, the methodology advances to bubble 76 where it is returned to start-up bubble 70. However, if the vehicle was in a drive or reverse gear state during the previous program loop, the methodology advances to decision block 80.

In decision block 80, the methodology determines if the fuel fill timer is complete. If not, the methodology advances to bubble 76 where it is returned to start-up bubble 70. If the timer is complete at decision block 80, the methodology advances to block 82 and records a current fuel level. After recording the current fuel level at block 82, the methodology advances to bubble 76 where it is returned to start-up bubble 70. Thereafter, a fuel composition multiplier learning routine of the fuel control system can be initialized.

Thus, the present invention provides a method of compensating for an erroring sensor in a fuel control system of a flexible fueled vehicle. According to the present invention, boil-off conditions are detectable during a coolant temperature sensor or battery temperature sensor error; fuel composition multiplier learning is enabled with an error coolant temperature sensor, vehicle speed sensor or fuel level sending unit; acceptable engine operation is possible with an exhaust oxygen sensor error; and possible alcohol concentrations may be calculated with a fuel level sending unit error.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of compensating for an erroring coolant temperature sensor in a flexible fuel compensation control system typically utilizing outputs of said sensor as input variables comprising:

selecting a routine in said flexible fuel compensation control system for identifying a potential boil-off condition of an internal combustion engine of said flexible fueled vehicle, said routine depending in part on a coolant temperature output of said sensor as an input variable;

determining if said sensor is erroring; and ignoring said sensor output as said input variable in said routine and assuming said potential boil-off condition exists if all remaining criteria in said routine indicate such.

2. The method of claim 1 wherein said sensor further comprises a battery temperature sensor and said sensor output further comprises battery temperature.

3. The method of claim 1 wherein said operating condition further comprises a percent alcohol content of fuel and said sensor further comprises an upstream exhaust oxygen sensor and said sensor output further comprises fuel to air ratio.

4. The method of claim 3 wherein said all remaining criteria includes a forced value of said percent alcohol content acceptable for a last known fuel used.

5. The method of claim 1 wherein said operating condition further comprises a vehicle stop, said sensor further comprises a vehicle speed sensor and said sensor output further comprises vehicle speed.

6. The method of claim 5 wherein said all remaining criteria includes a change in transmission state from drive/reverse to park/neutral.

7. The method of claim 1 wherein said operating condition further comprises a fuel addition, said sensor further comprises a fuel level sending unit and said sensor output further comprises a measured increase in fuel level.

8. The method of claim 7 wherein said all remaining criteria includes engine start-up.

9. The method of claim 8 wherein said all remaining criteria further comprises a maximum fuel tank volume as said fuel volume after said fuel fill-up.

10. The method of claim 1 wherein said operating condition further comprises possible alcohol concentrations in a fuel, said sensor further comprises a fuel level sending unit and said sensor output further comprises a fuel volume before a fuel fill-up and a fuel volume after said fuel fill-up.

11. A method of compensating for an erroring coolant temperature sensor in a flexible fuel compensation control system typically utilizing outputs of said sensor as input variables comprising:

selecting a routine in said flexible fuel compensation control system for identifying a fully warm engine condition of an internal combustion engine of said flexible fueled vehicle, said routine depending in part on a coolant temperature output of said sensor as an input variable;

determining if said sensor is erroring; and ignoring said sensor output as said input variable in said routine and assuming said fully warm engine condition exists if all remaining criteria in said routine indicate such.

12. The method of claim 11 wherein said all remaining criteria includes an expiration of a preselected time period.

* * * * *